Dec. 6, 1955     F. A. WADE ET AL     2,725,644
EDUCATIONAL DEVICE
Filed Nov. 22, 1952     2 Sheets-Sheet 1
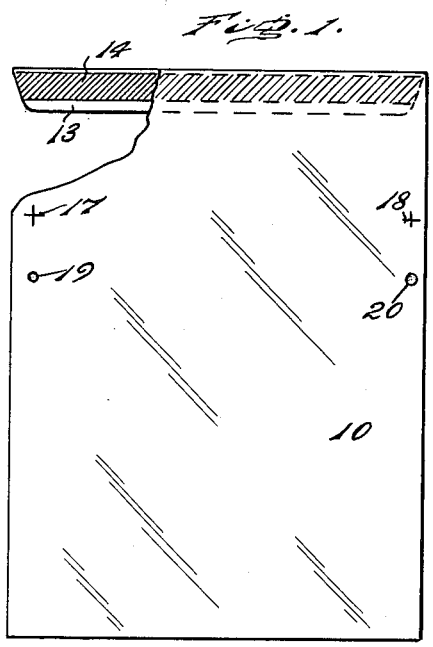
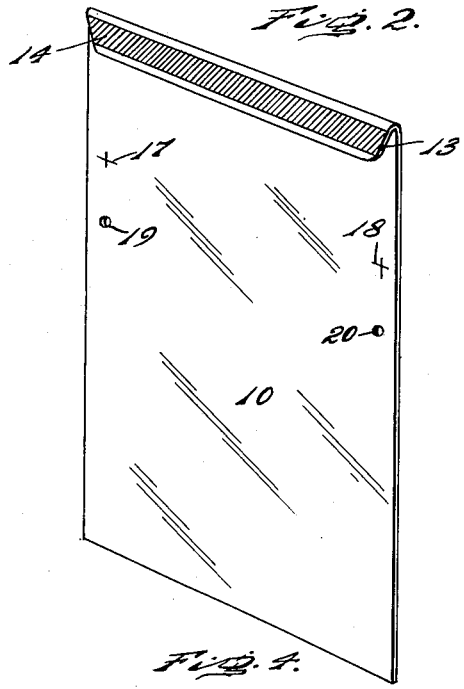
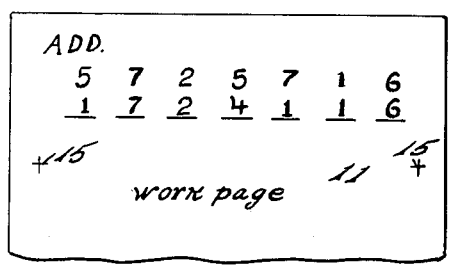
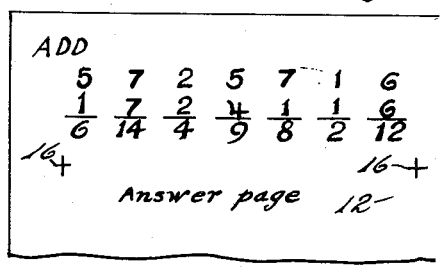
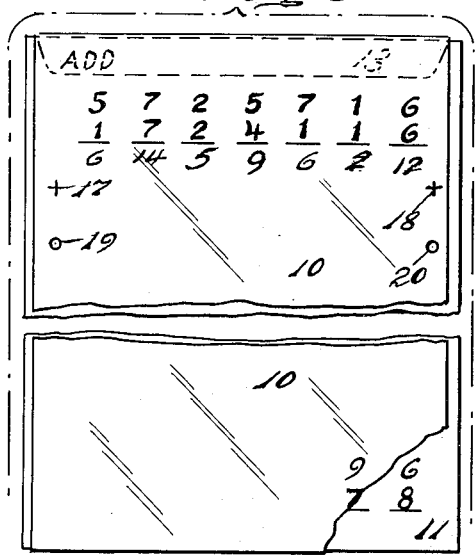
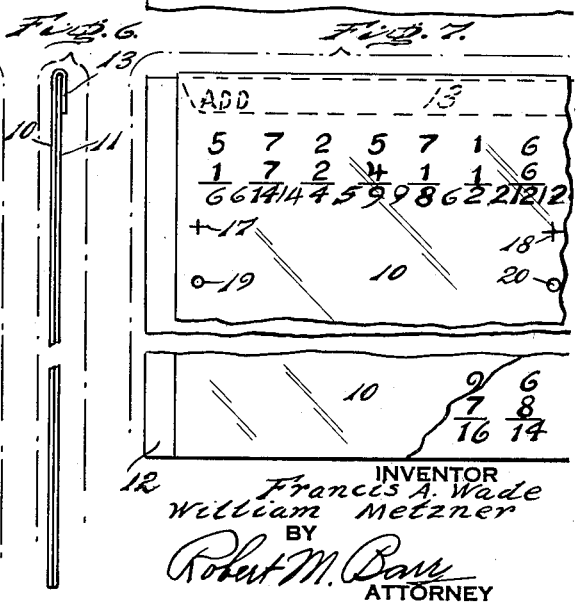
INVENTOR
Francis A. Wade
William Metzner
BY
Robert M. Barr
ATTORNEY

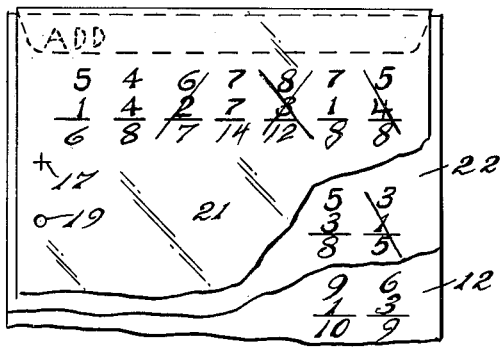
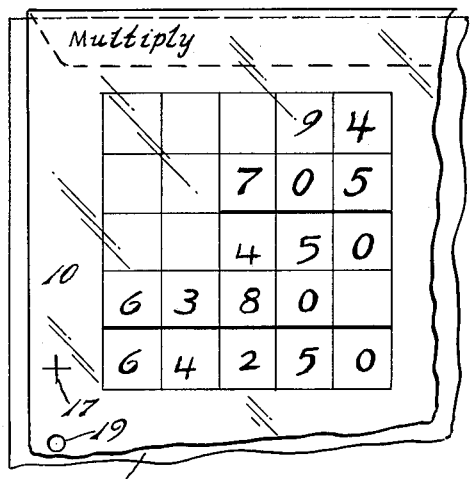
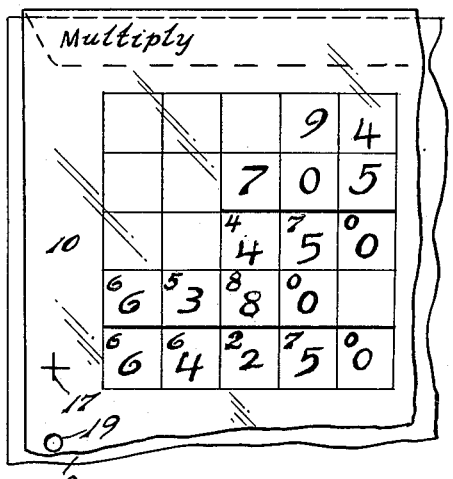
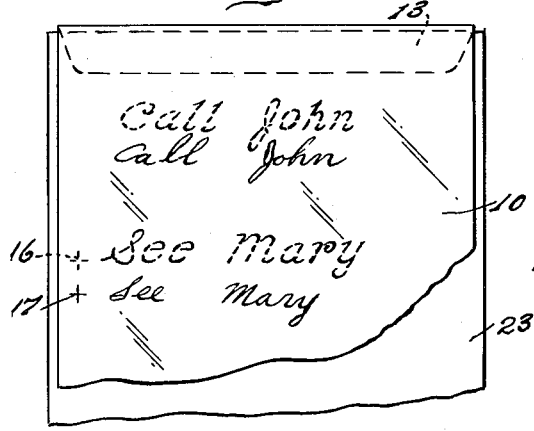
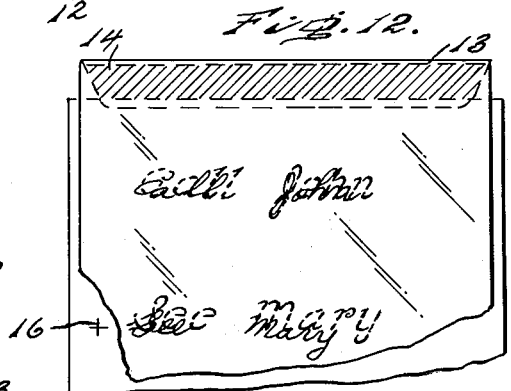
INVENTOR
Francis A. Wade
William Metzner
BY
Robert M. Barr
ATTORNEY.

United States Patent Office 2,725,644
Patented Dec. 6, 1955

2,725,644
EDUCATIONAL DEVICE

Francis A. Wade, Point Pleasant, and William Metzner, Philadelphia, Pa.

Application November 22, 1952, Serial No. 321,986

7 Claims. (Cl. 35—48)

The present invention relates to educational devices and more particularly to a novel transparent overlay designed to fit snugly over the pages of children's workbooks or over single printed test or practice sheets without slipping. The child fits the transparent overlay over the printed page or sheet, and then writes his answers to the problems on it with a grease or soap type crayon pencil; he, or his teacher, then checks the accuracy of his work using a corresponding answer sheet or page placed under the overlay; and the child finally removes his writing from the overlay by rubbing it with a dry cloth or soft tissue paper. Using the device thus, both the overlay and the workbook page or printed sheet are available for repeated use.

Heretofore devices for using transparent materials, such as Celluloid or cellulose acetate, over printed materials have been too cumbersome to use or of costly design. None of them could be readily adapted for use either with workbooks or by children in the lowest grades in school. The present invention is simple in design, can be manufactured cheaply, provides simple means both to help the child to keep the sheet in place or to detect its accidental movement, and further provides means to help the child to offset his work for ready comparison with appropriate answer pages or sheets. Workbooks presently on the market vary in size but an overlay of this design may be used with any workbook of approximately the same dimensions.

A workbook is made up of printed pages, each showing, for example, arithmetical problems, on which the pupil can write in his answer directly on the page instead of copying the example problems and then doing his work on a separate sheet of paper. The disadvantage in writing directly on the problem work page is that the pages cannot be used again by the same pupils or by successive classes.

Some of the objects of the present invention are; to provide an economical educational device for use by children in school and at home;

To provide a means for children to use workbooks, test booklets, printed sheets, and materials duplicated by the teacher over and over again with the same children or with successive classes instead of just once as consumable material as is presently the case;

To provide a device that enables the child to use again and again as if it were fresh material the same workbook page or printed sheet either for review, or because of errors, or to increase his speed, or to improve the quality of his work;

To provide a device employing a hook-shaped fold and flap to prevent slipping of the overlay as the child works;

To provide a device having a printed tell-tale bar and register marks to enable the teacher or child to detect and correct any chance slipping of the overlay that may have occurred;

To provide a device having printed register marks to be placed over similar register marks on the workbook pages or on the answer pages to help the child either to keep his overlay in position as he works or to assist him in offsetting his overlay on the answer sheet to the best position for checking his completed work;

To provide a device having register holes in the overlay for use with materials that are not provided with printed register marks so that the child may use these holes to locate and make his own register marks for the purposes aforesaid;

To provide a device that will enable the child to determine not only that his final answer to a complicated arithmetic example is incorrect but will show him exactly where his errors have been made;

To provide a means with the successive use of two of these devices whereby the teacher can tell whether a given mistake in arithmetic is accidental, therefore just needing greater care, or probably habitual, therefore, needing reteaching;

To provide a device that enables children to learn to write in manuscript or cursive style legibly and quickly by first tracing the model again and again to develop a good concept of its form and the muscular coordinations necessary to copy it, then by copying the model independently several times and superposing each copy over the model for evaluation and comparison;

To provide a device that not only may be used with any workbook, test booklet, or any printed or otherwise duplicated materials presently in use in schools in any subject of the curriculum, but one that will be especially effective with materials primarily designed for use with it and embodying such features as interchangeable work and answer pages or sheets, accurately placed register marks, workbooks with built-in answer pages, underprinted quadrilles for use in working arithmetic examples, etc.; and To provide such other improvements as will hereinafter appear.

In the accompanying drawings, Fig. 1 is a working face view of a transparent overlay embodying one form of the present invention; Fig. 2 represents a perspective of the same; Fig. 3 represents a fragment of a printed work sheet, such as a page of a book, or a separate sheet, showing a series of arithmetic problems and registration elements for use with the overlay; Fig. 4 represents a fragment of a printed answer sheet, also either a book page or separate sheet, showing the problems and answers; Fig. 5 is a face view of the overlay in place as superposed upon a work sheet, showing the problem and the pupil's handwritten answers; Fig. 6 represents an edge elevation of the assembly of Fig. 5; Fig. 7 is a face view of the overlay as superposed upon the answer page or sheet and showing the lateral offset for comparing the pupil's answers with the correct answer; Fig. 8 is a face view of two superposed overlays applied to an answer sheet for checking a second answer against a first answer; Fig. 8 is a face view of an overlay superposed upon a work sheet with problems for multiplication and showing the pupil's written answers; Fig. 10 is a face view of the overlay of Fig. 9 applied over the answer sheet for comparison with the correct answer; Fig. 11 is a fragmentary face enlarged view of an overlay applied to a work sheet having specimens of handwriting thereon and showing the pupil's attempt to duplicate the handwriting; and Fig. 12 is a fragmentary face enlarged view of the overlay of Fig. 11 as offset upward to a comparison position.

Referring to the drawings, one form of the present invention comprises a sheet 10 of transparent material, such as cellulose acetate, preferably of rectangular shape and dimensioned for superposing upon a book page or loose sheet as an overlay for viewing the printed matter in the first instance of arithmetical problems for solution by a pupil, and in the second instance printed answers to such problems. Hereinafter the pages or sheets will be referred to respectively as "work pages" and "answer pages." Thus, as shown in Fig. 3, a work page 11 comprises a plurality of printed rows of problems for addition, such rows extending in parallel spaced relation across the face of the page 11. The vertical spacing between the problem rows provides the proper clearance to permit the answers to be written upon the face of the overlay in registration with such rows. The answers are to be written in on the face of the overlay with a soap or grease crayon so that the overlay can be wiped clean at the completion of a test and made ready for use again. As shown in Fig. 4, an answer page 12 carries the same printed problems as upon the work page 11, being reproduced in line row and spacing relation, and having the printed answers to the problems properly located in the spaces between the rows of problems.

In order to locate the overlay sheet 10 properly superposed upon a work page 11 or upon an answer page 12, the upper marginal portion thereof is provided with a flap 13 which is formed by heat-bending the sheet one hundred and eighty degrees about a transverse line parallel to the top edge of the sheet. In such bending the formed reverse flap 13 is spaced laterally from the sheet body in order to serve as a hook to seat back of a book page as the overlay sheet 10 is slipped over the page and brought to viewing position. The face of the flap 13 which is visible through the overlay sheet is preferably shaded or colored for contrast with a page, and in the present instance this is by means of a green strip 14 printed, glued, or made fast to the flap 13 to parallel the fold line but slightly spaced therefrom. It will thus be seen that it is convenient to interfit the overlay sheet 10 with a page by using the left hand to seat the top of the page within the flap 13, such final or working position concealing the colored strip 14. Thus, the strip 14 becomes a tell-tale signalling any out-of-position relation of the overlay sheet. This position of the hand is a natural one to hold the overlay while writing with the right hand and thus maintains the overlay properly centered. Any relative shifting of the overlay sheet is at once signalled by a projecting of the color strip 14. Also, this color tell-tale makes the overlay readily visible when removed from the page and easily found if misplaced.

For the purpose of accurate registration of the overlay sheet 10 with a printed page, either a work page or an answer page, it is preferable to have the book or other pages printed with pairs of registration marks 15 and 16, one mark of each pair being at one side of the page and the other at the opposite side, both spaced horizontally a predetermined distance from the page printing, and vertically spaced conveniently about medially of the page. Likewise, the overlay sheet 10 is provided with two registration marks 17 and 18 to symmetrically locate with respect to the page marks 15 and 16. Thus, when the overlay marks register with the page marks, the overlay sheet is accurately located for use. In the form of the invention shown in Figs. 5 and 7, the registration mark 16 upon the answer page 12 is indented or offset sufficiently to bring the answers as written on the overlay sheet to one side of the printed answers so that ready comparison can be made.

Where work and answer pages have no registration marks printed thereon, provision is made for accurately locating the overlay sheet by means of perforations 19 and 20 through the sheet, respectively in vertical alinement with the registration marks 15 and 16 and preferably in close proximity thereto. Now by placing the overlay sheet upon the page and properly adjusting it to the printed data, a pencil mark can be made through each perforation upon the underneath page and these marks can now serve for registration each time the overlay sheet is used.

The operation of the device for the work and answer pages of Figs. 5 and 7 consists in placing the overlay sheet flat upon the face of the work sheet, then moving it with the left hand to bring the flap 13 back of the page in hooking relation until the tell-tale strip is entirely concealed by the page. As so positioned, it is shifted until its registration marks 17 and 18 respectively register with the two marks 15, and the assembly is ready for use. The pupil using a soap or grease pencil now writes the answers to the respective problems of addition upon the face of the overlay sheet with each answer as usual below its problem. When all problems have been solved, the pupil transfers the overlay sheet to the answer page by hooking the flap 13 over the top of the page until its concealed position indicates the overlay sheet is vertically located to bring each row of overlay answers into the plane of the printed answers. The located overlay sheet is now manually shifted, if necessary, to bring its marks 17 and 18 into register with the page marks 16, but in this instance the left hand work 16, being indented, shifts the row of pencil answers into alinement respectively with the spaces between problem columns so that each answer appears directly besides the true printed answer as viewed through the overlay. The pupil and the teacher can now compare the pupil's answer with the correct answers and ascertain what errors have been made.

In Fig. 8 of the drawings a modification of the use of the invention is shown, wherein two overlay sheets 21 and 22 are used, one being a check upon the other. The overlay sheet 21 is first used as heretofore described but when placed upon the answer page the teacher marks each error diagonally leftward on the overlay sheet above the error. This overlay sheet 21 is now removed. The second overlay sheet 22 is placed over the same work sheet and the same problems again worked by the pupil and the answers written upon the sheet 22. Overlay sheet 22 is now placed over the answer page and the teacher marks each error with a downward diagonal stroke to the right of the overlay above the error. The sheet 21 is now superposed upon the overlay sheet 22 which remains over the answer sheet. Now disregarding answers and analyzing the marking strokes, two errors on the same problem will be identified by the teacher's crossed strokes, while a single diagonal stroke indicates the pupil has failed once, showing weakness or carelessness. Two failures on the same problem, as evidenced by crossed strokes, shows the pupil needs re-teaching and subsequent experience and practice on that addition fact. The same technique using two overlays may be used with more complicated problems.

Referring to Figs 9 and 10, work and answer pages are shown with quadrille under printing intended to keep each of the pupil's figures in proper order and place value relation as written upon the overlay sheet. This type of printing is particularly helpful for more difficult problems. In this use, which is indicated as multiplication, the answer page carries small answer numbers respectively in the upper corners of the squares so that the pupil's answers on the superposed overlay sheet appear adjacent to but clearly visible without interference. With answers so printed, offsetting of the overlay sheet over the answer sheet is not required. In the pupil's work shown in Figs. 9 and 10, the teacher can easily see that the pupil always forgot to carry in multiplication although he did it correctly in adding partial products.

Referring to Figs. 11 and 12, a work page 23 is shown having models of handwriting thereon, such models being horizontally disposed and vertically spaced so that when a transparent sheet 10 is superposed upon the printed work page 23, the pupil can first trace over the model several times erasing his tracing each time; when he has thus developed both a visual and a kinaesthetic concept of the form of the words and of their component letters, he then copies the model in the space below it. On the work page 23 a second dotted line registration mark 24 is printed and is located sufficiently higher on the page to superpose the pupil's copied line over the printed model line when the transparent sheet is moved upward so that its registration mark 17 is superposed over the dotted line register mark 24. Such upward movement of the transparent overlay shows the flap 13 extending above the top margin of the work page, Fig. 12; the sheet 10 is broken away to show the two printed registration marks, 16 and 24; further the upward displacement of the sheet brings the handwriting of the pupil over the printed model, shown in dotted line to aid comparison, and its variation from the model can be easily seen. In practice, models will be probably printed in color to facilitate comparison. After the pupil compares his writing with the model and sees its defects, he can immediately erase it, and then practice and compare it repeatedly until he has attained satisfactory skill.

A few additional explanations may be advisable for a completer understanding of this disclosure:

Whenever necessary the teacher can make as many answer books as she needs by merely doing the problems herself on a pupil's book with red ink or crayon. The registration perforations in the overlay can be used to locate and make registration marks, offset where advisable.

When working with overlays over separate printed sheets, the registration marks or perforations on one or both sides of the overlay or sheet may be used. When using a workbook with narrow pages, the mark or perforation next to the binding is the one suitable for use.

Although most any shape mark can be used for registration, the upright of the cross has been found best for horizontal registration and its cross-bar best for vertical registration.

The illustrations in the various figures have been selected from arithmetic and handwriting because these subjects lend themselves more readily to work and answer comparison. The device can be used with almost any bookwork in any school subject, or with any printed or duplicated test or practice sheet. Whatever a pupil can write on a printed page may be written instead on the transparent overlay, may be compared or marked with a minimum of marking error, and the teacher still has the costly printed material available for re-use.

Having thus described our invention, we claim:

1. An educational device comprising a transparent sheet for overlaying a printed page, a reversely turned flap on one sheet edge to hook about and seat over a margin of said page with said flap back of the sheet, and means on said flap forming a contrast with the color of said page as a tell-tale for indicating correct sheet and page relation, said means comprising a colored strip parallelling the fold of said flap, said strip being arranged to be visible only when said sheet is out of transverse alignment with the margin of said printed page, whereby such misalignment is noticeable by anyone.

2. An educational device in accordance with claim 1 wherein means is provided for registering said sheet laterally on said page.

3. An educational device comprising the combination of a page printed with one of more exercises or problems and having a registration mark adjacent one edge, a transparent sheet for overlaying said page, a reversely turned flap along one sheet edge to hook about and seat a margin of said page, a mark on said sheet symmetrically located with respect to said page mark for registering said sheet with said page, a second page printed with answers to said problems and having a registration mark symmetrically located with respect to said sheet mark, whereby answers placed on said sheet when over the problem page can be compared with the correct answers when said sheet is over the answer page.

4. An educational device comprising the combination of a page printed with one or more mathematical problems, a registration mark adjacent an edge of said page, a transparent sheet for overlaying said page, a reversely turned flap along one sheet edge to hook about and seat a margin of said page, a mark on said sheet symmetrically located with respect to said page mark for registering said sheet with said page, a second page printed with said problems plus answers, a mark on said second page horizontally offset with respect to the mark on the first page to position answers written on said sheet beside the printed answers when said sheet is superposed on said second sheet and said sheet mark is in register with said offset mark.

5. An educational device in accordance with claim 4, wherein said flap is distinguished by color from said printed page.

6. An educational device comprising the combination of a page printed with problems, and a transparent sheet for overlaying said page to expose said problems for the writing of answers on said sheet, a reversely turned flap along one sheet edge to hook about and seat a margin of said page, said sheet having a perforation for the passage of a marking utensil to make a registration mark on said printed page, whereby a sheet can be replaced in proper position on said page by bringing said perforation into registration with said mark.

7. An educational device comprising the combination of a page printed with problems, a transparent sheet for overlaying said page, a reversely turned flap along one sheet edge to hook about and seat a margin of said page, and a second page printed with answers to said problems, said sheet having a perforation for the passage of a marking utensil to make a registration mark on each page symmetrically located with respect to each other, whereby said sheet can be identically and successively located over a work page and an answer page by registering the perforation with a page mark for answer comparing purposes.

References Cited in the file of this patent

UNITED STATES PATENTS

| | | |
|---|---|---|
| 1,860,909 | Taylor | May 31, 1932 |
| 2,137,736 | Watkins | Nov. 22, 1938 |
| 2,497,200 | Appel | Feb. 14, 1950 |